(12) United States Patent
Sato

(10) Patent No.: US 11,589,113 B2
(45) Date of Patent: Feb. 21, 2023

(54) SMART START-UP OF TELEVISION

(71) Applicant: Saturn Licensing LLC, New York, NY (US)

(72) Inventor: Ryosuke Sato, Kanagawa (JP)

(73) Assignee: SATURN LICENSING LLC, New York, NY (US)

(*) Notice: Subject to any disclaimer, the term of this patent is extended or adjusted under 35 U.S.C. 154(b) by 0 days.

(21) Appl. No.: 16/477,700

(22) PCT Filed: Jan. 5, 2018

(86) PCT No.: PCT/JP2018/000082
§ 371 (c)(1),
(2) Date: Jul. 12, 2019

(87) PCT Pub. No.: WO2018/135314
PCT Pub. Date: Jul. 26, 2018

(65) Prior Publication Data
US 2019/0364335 A1  Nov. 28, 2019

(30) Foreign Application Priority Data

Jan. 20, 2017 (JP) ............................. JP2017-008311

(51) Int. Cl.
H04N 21/443 (2011.01)
H04N 21/422 (2011.01)
H04N 21/442 (2011.01)

(52) U.S. Cl.
CPC ... H04N 21/4436 (2013.01); H04N 21/42216 (2013.01); H04N 21/4432 (2013.01); H04N 21/44224 (2020.08)

(58) Field of Classification Search
CPC ......... H04N 21/4436; H04N 21/42216; H04N 21/4432; H04N 21/4826; H04N 21/44222;
(Continued)

(56) References Cited

U.S. PATENT DOCUMENTS 5,338,377 A * 8/1994 Mitamura ............... F16C 33/62
148/318
5,684,525 A * 11/1997 Klosterman ..... H04N 21/47214
725/48
(Continued)

FOREIGN PATENT DOCUMENTS

CN  102918572 A  2/2013
EP     2577638 A1  4/2013
(Continued)

OTHER PUBLICATIONS

International Search Report of International Application No. PCT/JP2018/000082, dated Apr. 10, 2018.
(Continued)

*Primary Examiner* — John W Miller
*Assistant Examiner* — Humam M Satti
(74) *Attorney, Agent, or Firm* — Richard LaPeruta

(57) ABSTRACT

A control method according to one aspect of the technology is for use where a power supply of an apparatus having a first application and a second application is turned off during display of a screen of the second application and remains off, the first application being used to view a program, the second application being different from the first application. The control method includes: in a case where a power button is pressed, turning on the power supply of the apparatus to start simultaneously the second application and to display the screen thereof; and in a case where a channel selection button is pressed, turning on the power supply of the apparatus to start simultaneously the first application and to display an image of the program distributed on a selected channel.

17 Claims, 11 Drawing Sheets

(58) Field of Classification Search
CPC ....... H04N 21/42204; H04N 21/42206; H04N 5/63; H04N 21/44224
See application file for complete search history.

(56) References Cited

U.S. PATENT DOCUMENTS

| | | | | |
|---|---|---|---|---|
| 6,829,512 | B2* | 12/2004 | Huang | G08C 19/28 340/12.28 |
| 8,253,866 | B1* | 8/2012 | Weber | H04N 21/42206 348/734 |
| 8,307,397 | B2* | 11/2012 | Park | H04N 21/4622 725/59 |
| 10,720,047 | B2* | 7/2020 | Hong | H04N 21/44222 |
| 2002/0042889 | A1* | 4/2002 | Takahashi | G06F 9/4401 713/320 |
| 2002/0122079 | A1* | 9/2002 | Kamen | G06F 3/0489 348/E5.103 |
| 2005/0235294 | A1 | 10/2005 | Kimura et al. | |
| 2012/0320271 | A1 | 12/2012 | Chen et al. | |
| 2013/0054954 | A1* | 2/2013 | Lee | H04N 21/4432 713/2 |
| 2013/0136455 | A1 | 5/2013 | De Buysscher et al. | |
| 2013/0322846 | A1* | 12/2013 | Ferren | G06F 3/0346 386/234 |
| 2014/0098294 | A1* | 4/2014 | Hsu | G06F 3/0482 348/569 |
| 2014/0130081 | A1* | 5/2014 | Ozawa | H04N 21/4532 725/25 |
| 2014/0139741 | A1* | 5/2014 | Momosaki | H04N 21/47 348/553 |
| 2014/0176805 | A1* | 6/2014 | Matsuda | H04N 5/63 348/730 |
| 2014/0267933 | A1* | 9/2014 | Young | H04N 5/4403 348/734 |
| 2014/0320749 | A1* | 10/2014 | Kawasaki | H04N 5/63 348/730 |
| 2015/0138444 | A1 | 5/2015 | Hirabayashi et al. | |
| 2015/0304592 | A1* | 10/2015 | Kim | H04N 21/4755 348/734 |
| 2016/0103477 | A1 | 4/2016 | Park et al. | |
| 2016/0255389 | A1* | 9/2016 | Stransky-Heilkron | H04N 21/4104 725/37 |
| 2017/0249158 | A1* | 8/2017 | Oh | G06F 9/4405 |
| 2019/0332159 | A1* | 10/2019 | Wei | G06F 3/0488 |

FOREIGN PATENT DOCUMENTS

| | | |
|---|---|---|
| JP | 2013535127 A | 9/2013 |
| JP | 2014102789 A | 6/2014 |
| JP | 2015050655 A | 3/2015 |
| WO | 2010023900 A1 | 3/2010 |

OTHER PUBLICATIONS

Samsung, UE46C6710 LED-TV 46, Oplossingen en tips, Aug. 13, 2013. 4 Pages. URL:https://www.samsung.com/nl/support/model/UE46C6710USXXN/#downloads.

Chinchilla, A.T., Bibliographic Information for "SamsungTV Modeswitch," Dec. 14, 2021, 2 Pages. URL:https://www.youtube.com/watch?v=F0dZJxpR2po.

Extended European Search Report including the Search Opinion for Application No. EP 18742131.8 dated Sep. 17, 2019, 8 pages.

Samsung: LED TV User Manual for UE46C6710US, Dec. 9, 2010, pp. 1-61, retrieved from the internet: URL: https://downloadcenter.samsung.com/content/UM/201012/20101209162302218/[UC6700]BN68-02841A-04L04-1209.pdf, [retrieved on Dec. 15, 2021].

* cited by examiner

SMART START-UP OF TELEVISION

CROSS-REFERENCE TO RELATED APPLICATIONS

This application is a national phase entry under 35 U.S.C. § 371 of International Application No. PCT/JP2018/000082 filed Jan. 5, 2018, which claims the priority from Japanese Patent Application No. 2017-008311 filed in the Japanese Patent Office on Jan. 20, 2017, the entire contents of which are hereby incorporated by reference.

TECHNICAL FIELD

The present technology relates to a control method, a program, and a control apparatus. More particularly, the technology relates to a control method, a program, and a control apparatus for executing the process desired by a user upon pressing of a button when the power supply of the apparatus remains off.

BACKGROUND ART

Recent years have seen the widespread use of television receivers (TVs) incorporating an OS (Operating System) for the TV, such as the so-called modern OS.

Installed in such TVs are various applications operating on the TV OS, including an application for viewing TV programs, applications for viewing videos distributed over the Internet, and applications for playing games. The user operates menu screens to start a desired application and make use of its various functions.

CITATION LIST

Patent Literature

[PTL 1]
JP 2015-050655A

SUMMARY

Technical Problem

Some of the existing TVs not incorporating the TV OS are turned on upon pressing of not the power button but a number button of a TV remote controller with the power supply of the TV remains off. This starts reception of the channel corresponding to the pressed number button.

Conceivably, the TV incorporating the TV OS may also include a function that, when the power supply remains off, turns it on upon operation of the remote controller so as to execute a predetermined process immediately after power-on. The process should preferably be changed, for example, depending on the application used by the user immediately before the power supply was turned off.

The present technology has been devised in view of the above circumstances. An object of the technology is therefore to let the process desired by the user be executed upon pressing of a button of the apparatus when the power supply of the apparatus remains off.

Solution to Problem

According to one aspect of the present technology, there is provided a control method for use where the power supply of an apparatus having a first application and a second application is turned off during display of a screen of the second application and remains off, the first application being used to view a program distributed on each of channels in accordance with a predetermined schedule, the second application being different from the first application. The control method includes the steps of: in a case where a power button used to turn on or off the power supply is pressed, turning on the power supply of the apparatus to start simultaneously the second application and thereby display the screen thereof; and in a case where a channel selection button used to select a channel is pressed, turning on the power supply of the apparatus to start simultaneously the first application and thereby display an image of the program distributed on the selected channel.

Where the power supply of the apparatus is turned off during display of the image of the program distributed on a given channel and remains off, the control method may further include the steps of: in a case where the power button is pressed, turning on the power supply of the apparatus to start simultaneously the first application and thereby display the image of the program on the channel that was selected immediately before the power supply of the apparatus was turned off; and in a case where the channel selection button is pressed, turning on the power supply of the apparatus to start simultaneously the first application and thereby may display the image of the program distributed on the selected channel.

The first application may process the program distributed by use of a broadcast signal, and the second application may process video content distributed over a network in accordance with a selection made by a user.

The control method may further include a step of determining whether the power button or the channel selection button is pressed in accordance with a command transmitted from an operating device equipped with the power button and the channel selection button.

According to another aspect of the present technology, there is provided a control method for use where a power supply of an apparatus having a first application and a second application is turned off during display of a screen of the second application and remains off, the first application being used to view a program distributed on each of channels in accordance with a predetermined schedule, the second application being different from the first application. The control method includes a step of turning on the power supply of the apparatus to start simultaneously the second application and thereby execute a predetermined process in a case where a channel selection button is pressed, the channel selection button being used to select a channel during display of an image of the program distributed on a given channel, the channel selection button being further used to select the predetermined process assigned to the channel selection button during activation of the second application.

The control method may further include the steps of: in a case where the channel selection button is pressed while the power supply of the apparatus remains off, turning on the power supply of the apparatus to display simultaneously a screen for selecting whether to start the first application to display the image of the program distributed on the selected channel or to start the second application to execute the predetermined process; and in a case where a user selects execution of the predetermined process, start the second application to execute the predetermined process.

The control method may further include the steps of: in a case where the channel selection button is pressed during display of the screen of the second application while the power supply of the apparatus remains on, displaying a screen for selecting whether to display the image of the program distributed on the selected channel or to execute the predetermined process using the second application; and in a case where a user selects execution of the predetermined process, executing the predetermined process using the second application.

Thus, according to one aspect of the present technology, where a power supply of an apparatus having a first application and a second application is turned off during display of a screen of the second application and remains off, the first application being used to view a program distributed on each of channels in accordance with a predetermined schedule, the second application being different from the first application; when a power button used to turn on or off the power supply is pressed, the power supply of the apparatus is turned on to start simultaneously the second application and thereby display the screen thereof. In a case where a channel selection button used to select a channel is pressed, the power supply of the apparatus is turned on to start simultaneously the first application and thereby display an image of the program distributed on the selected channel.

According to the other aspect of the present technology, there is thus provided a control method for use where a power supply of an apparatus having a first application and a second application is turned off during display of a screen of the second application and remains off, the first application being used to view a program distributed on each of channels in accordance with a predetermined schedule, the second application being different from the first application. The power supply of the apparatus is turned on to start simultaneously the second application and thereby execute a predetermined process when a channel selection button is pressed, the channel selection button being used to select a channel during display of an image of the program distributed on a given channel, the channel selection button being further used to select the predetermined process assigned to the channel selection button during activation of the second application.

Advantageous Effect of Invention

Thus, according to the present technology, where the power supply of the apparatus remains off, pressing a button of the apparatus may execute the process desired by the user.

It should be noted that the effect described above is by no means necessarily limited thereto, and any of the effects described in the present disclosure may be offered.

BRIEF DESCRIPTION OF DRAWINGS

FIG. 4 is a diagram depicting an example of behavior observed when the power supply is turned on.

FIG. is a flowchart explaining a TV control process.

Figure 8:
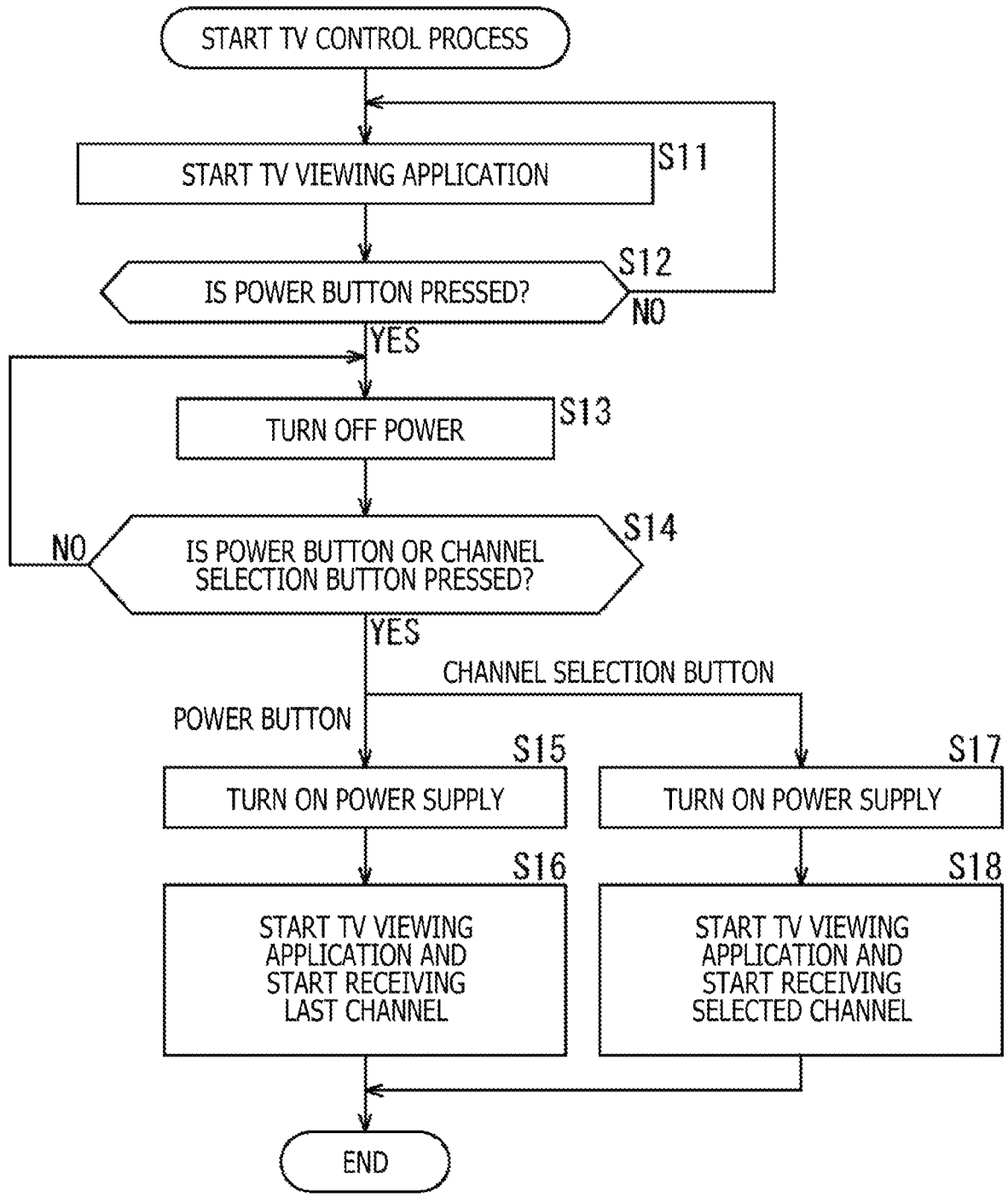

FIG. 8 is a flowchart explaining another TV control process.

Figure 9:
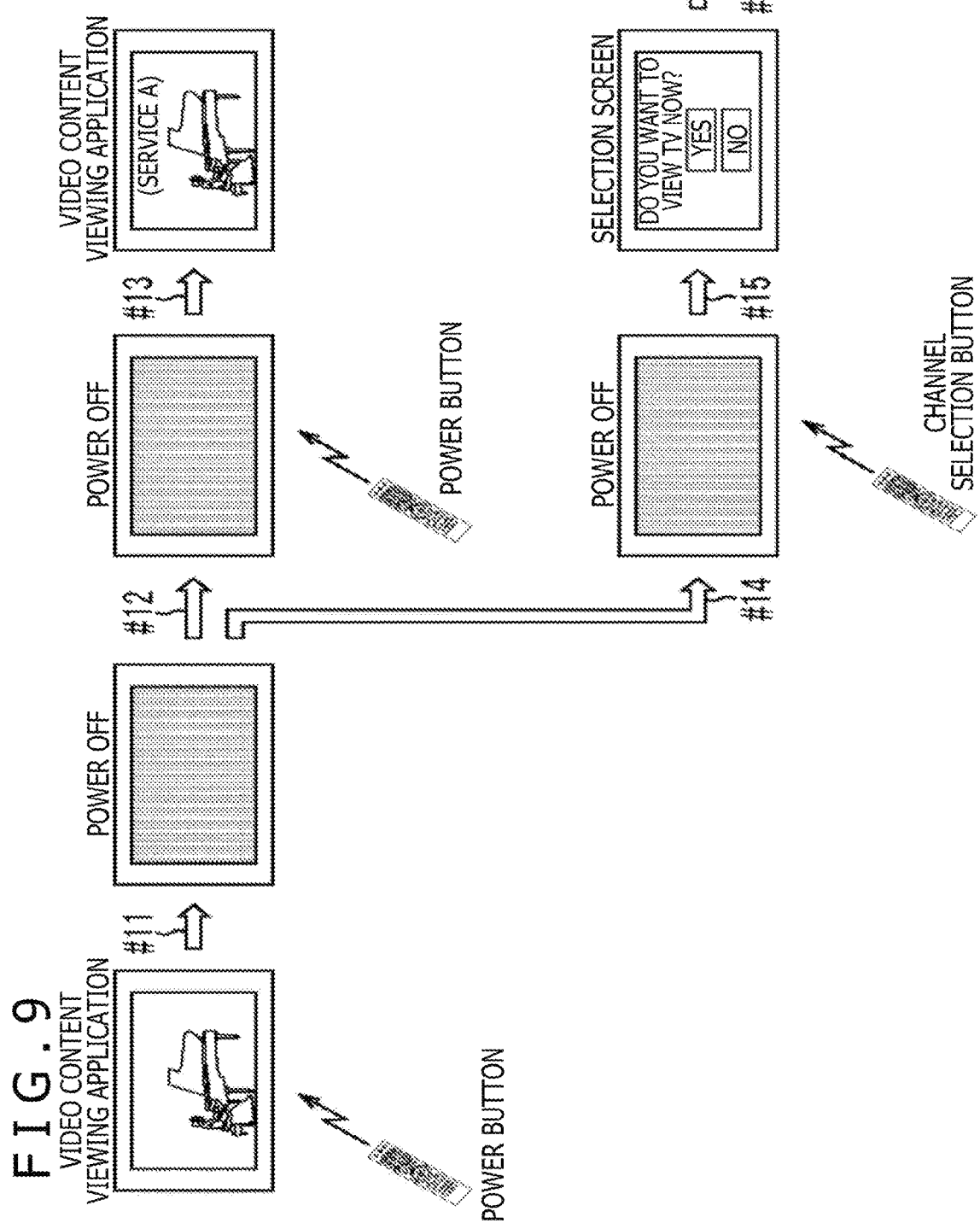

FIG. 9 is a diagram depicting another example of behavior observed when the power supply is turned on.

Figure 10:
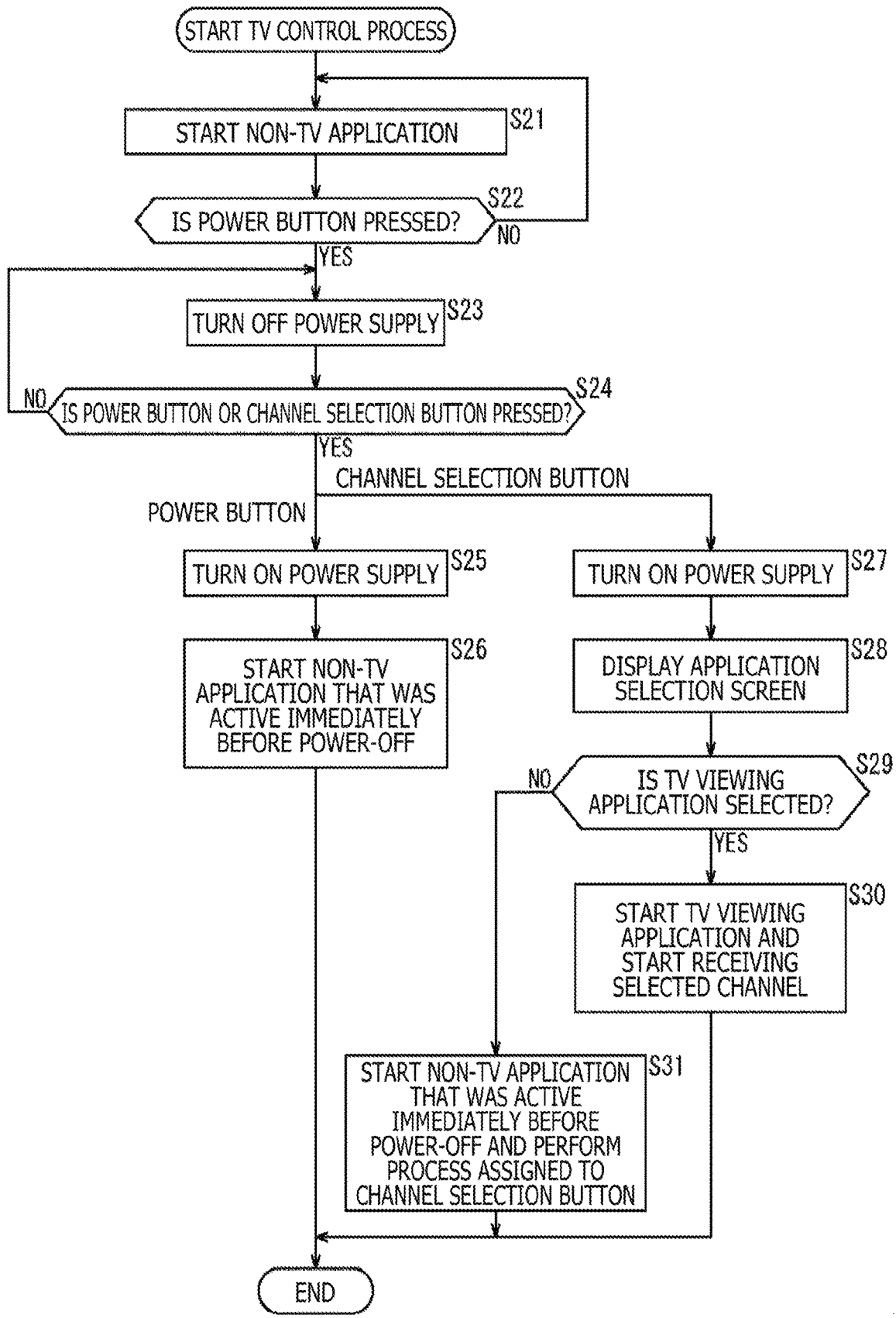

FIG. 10 is a flowchart explaining still another TV control process.

Figure 11:
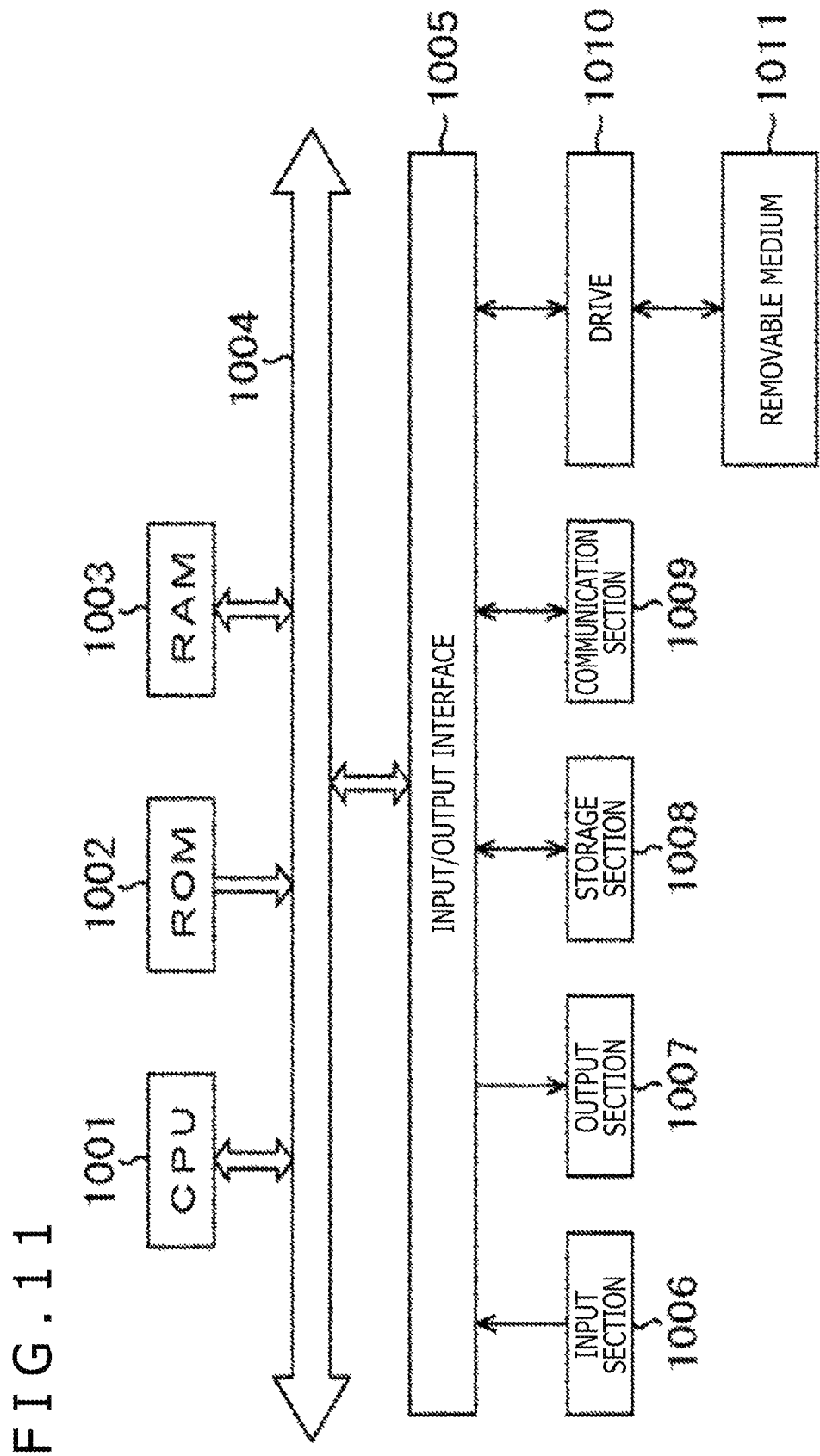

FIG. 11 is a block diagram depicting a typical computer configuration.

DESCRIPTION OF EMBODIMENTS

Some embodiments for implementing the present technology are described below. The description is given under the following headings:
1. First embodiment (an example of giving priority to program viewing)
2. Second embodiment (an example of letting the user select a preferred process)
3. Other examples First Embodiment <Typical Configuration of the Information Processing System>

Figure 1:
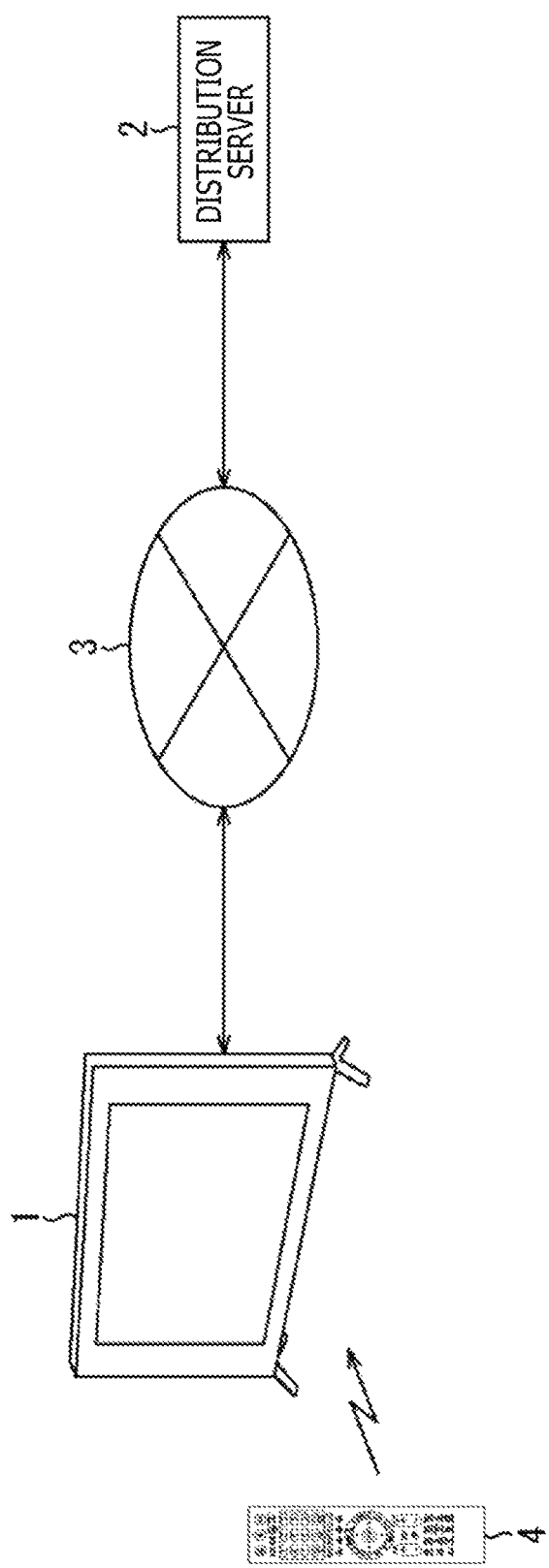
FIG. 1 is a diagram depicting a typical configuration of a viewing system as one embodiment of the present technology.

FIG. 1 is a schematic diagram depicting a typical configuration of a viewing system as one embodiment of the present technology.

The viewing system in FIG. 1 is configured with a television receiver 1 (referred to as the TV 1 where appropriate hereinafter) and a distribution server 2 connected with one another via a network 3 such as the internet. A remote controller 4 is used to operate the TV 1. Commands corresponding to the buttons pressed by the user on the remote controller 4 are transmitted to the TV 1.

Communication takes place between the TV 1 and the distribution server 2 via the network 3. The network 3 may be any form of a wired network, a wireless network, or a network that combines wired and wireless networks.

The TV 1 receives TV broadcasts such as terrestrial digital broadcasts, satellite broadcasts, and cable broadcasts from broadcast stations, not depicted. The TV 1 displays images of a broadcast program on its display while outputting the sound of the program from speakers. Alternatively, the programs may be distributed via the network 3.

It is assumed here that the programs received by the TV 1 are distributed on each channel in accordance with predetermined schedules. The transmission path over which the programs are distributed is not limited to any specific type of path as long as the programs are distributed on multiple channels in suitable time slots according to the schedules given by an EPG (Electronic Program Guide), for example. More specifically, the programs may be distributed not only by broadcast wave but also over the network 3.

The distribution server 2 distributes video content to apparatuses including the TV 1 via the network 3. Applications for receiving and reproducing the video content distributed by the distribution server 2 are installed in the apparatuses serving as the destinations for video content distribution. These applications are also installed in the TV 1.

Figure 2:
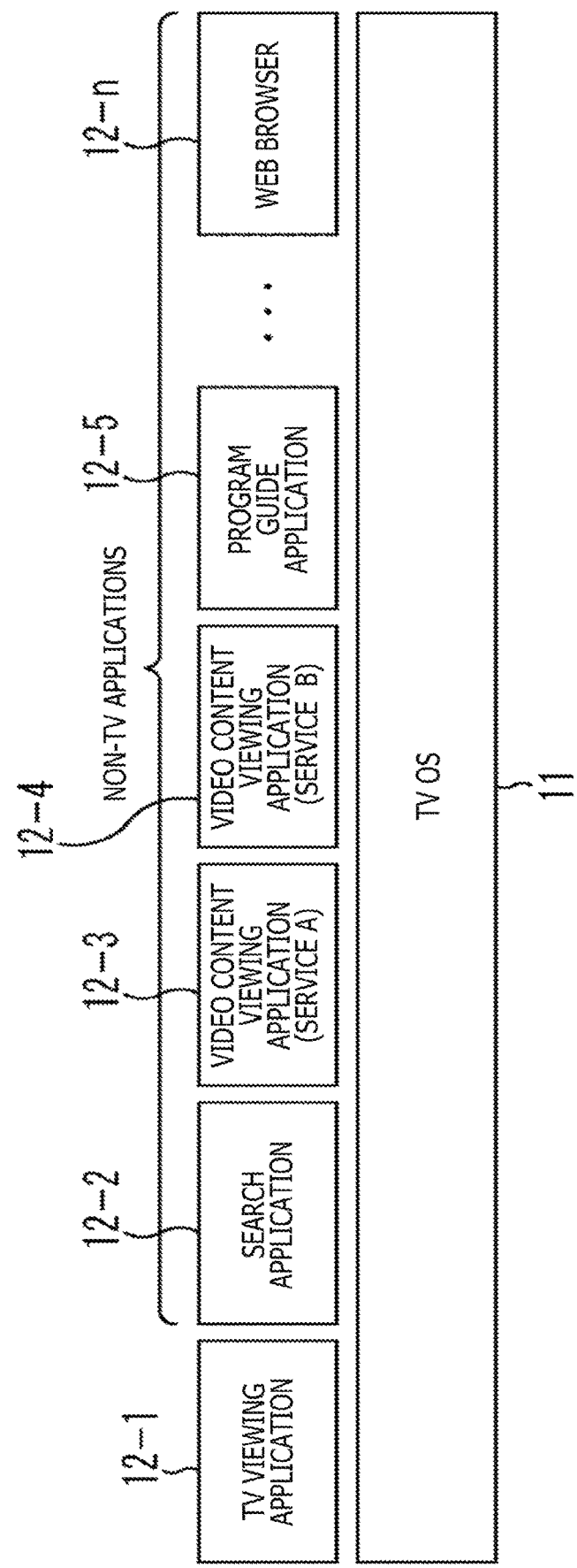
FIG. 2 is a diagram depicting an example of TV application structure.

FIG. 2 is a schematic diagram depicting a typical TV 1 application structure.

A TV OS (Operating System) 11 is installed in the TV 1. Various applications operating on the TV OS 11 are also installed in the TV 1. The structure example in FIG. 2 indicates a TV viewing application 12-1, a search application 12-2, video content viewing applications 12-3 and 12-4, a program guide application 12-5, and a Web browser 12-n.

The TV viewing application 12-1 manages the viewing of programs distributed over various transmission paths. During activation of the TV viewing application 12-1, the user may operate the remote controller 4 to select a desired channel and view the program currently broadcast on the selected channel.

The search application 12-2 is used to search for the content on the Web in accordance with keywords input by the user either by voice or by operation of the remote controller 4. The content searched for by the search application 12-2 includes diverse types of digital data usable by the user and made of websites, videos, still images, music, games, electronic publications, applications, and combinations of at least two of these types of data.

The video content viewing application 12-3 manages the viewing of the video content distributed by the distribution server 2, for example. In the structure example of FIG. 2, a video content distribution service performed by use of the distribution server 2 is noted as "service A."

For example, during activation of the video content viewing application 12-3, the TV 1 displays menu screens based on the information transmitted from the distribution server 2. The menu screens display information regarding the video content available for viewing, such as titles and thumbnail images. By viewing this information, the user may select desired video content. When a predetermined video content is selected by the user, the video content starts to be distributed. The video content distributed by the distribution server 2 is received by the TV 1 and starts to be reproduced thereby.

In this manner, the video content that can be viewed by use of the video content viewing application 12-3 is distributed when selected by the user. More specifically, the video content differs from the above-mentioned programs distributed according to the schedules determined by providers even in the same video.

The video content viewing application 12-4 manages the viewing of the video content distributed by "service B." The TV 1 is configured to be capable of using distribution services offered by multiple business operators.

The distribution of video content by "service B" is performed, for example, by a server different from the distribution server 2. The network 3 is connected with various servers that execute predetermined functions by working with applications installed in the TV 1.

The program guide application 12-5 manages the display of program guides. The Web browser 12-n is also included in the structure example of FIG. 2.

The TV viewing application 12-1 is the software prepared, for example, by the manufacturer producing and marketing the TV 1. The video content viewing applications 12-3 and 12-4 are the software prepared, for example, by business operators providing their services. The search application 12-2 and the Web browser 12-n are the software prepared by the business providing the TV OS 11.

Various functions including reception and reproduction of programs and of video content as well as searches for programs are implemented by execution of these application programs. The applications other than the TV viewing application 12-1 are used for purposes different from the general purpose of the TV receiver for viewing programs. In the description that follows, the applications other than the TV viewing application 12-1 will be referred to as non-TV applications where appropriate.

The TV 1 with various functions is operated by use of the remote controller 4 as described above.

Figure 3:
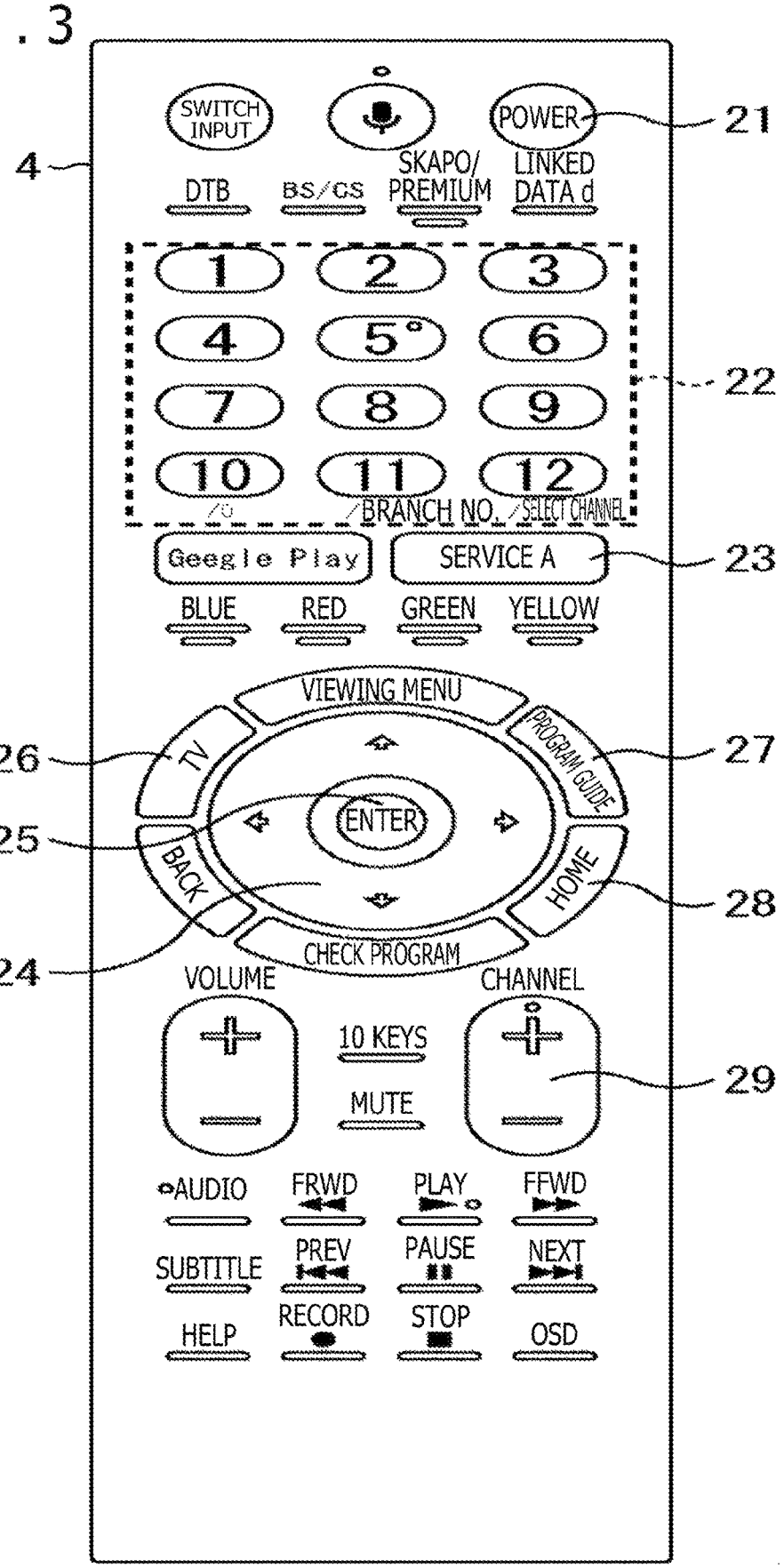
FIG. 3 is a diagram depicting an example of appearance of a remote controller.

FIG. 3 is a schematic diagram depicting a typical appearance of the remote controller 4. Various buttons are disposed on the front of the remote controller 4 in a vertically elongated rectangular parallelepiped enclosure. The major buttons of the remote controller 4 are explained below.

At the top right of the remote controller 4 is a round-shaped power button 21. The power button 21 is used to turn on or off the power supply of the TV 1.

Under the power button 21 are number buttons 22. The number buttons 22 include 4 rows by 3 columns of horizontally elongated buttons representing the numbers 1 through 12. The number buttons 22 are used to switch the channels for program reception.

At the bottom right of the number buttons 22 is a net video button 23 marked "service A." The net video button 23 is pressed to start the video content viewing application 12-3 so as to view the video content provided by the service A.

At the approximate center of the remote controller 4 is a round-shaped cross button 24. In the middle of the cross button 24 is an enter button 25. The cross button 24 is used to select items on various screens, and the enter button 25 is used to finalize the desired item.

Multiple buttons are arranged in a manner surrounding the cross button 24. At the top left of the cross button 24 is a TV button 26. At the top right of the cross button 24 is a program guide button 27. At the bottom right of the cross button 24 is a home button 28.

The TV button 26 is pressed to start the TV viewing application 12-1 to view programs, for example. The program guide button 27 is pressed to start the program guide application 12-5 to display program guides. The home button 28 is pressed to display a home screen, for example. The home screen is used to select functions such as viewing of programs, viewing of video content, recording of programs, and viewing of recorded programs.

Under the home button 28 is a vertically oriented oval-shaped channel button 29. The upper part of the channel button 29 marked "+" is pressed to select the channel number next to the currently selected channel number (channel-up operation). Moreover, the lower part of the channel button 29 marked "−" is pressed to select the channel number previous to the currently selected channel number (channel-down operation).

For example, during viewing of a program, the user may change the channel by pressing either one of the number buttons 22 or the channel button 29. In the description that follows, the number buttons 22 and the channel button 29 may be collectively referred to as the channel selection buttons where appropriate in a case where the buttons are not needed to be distinguished.

A mobile terminal such as so-called a smartphone or a tablet terminal may be used in place of the remote controller 4 for operating the TV 1. In this case, the applications for operating the TV 1 are installed in the mobile terminal. When an application for operating the TV 1 is started, the mobile terminal displays various buttons similar to those depicted in FIG. 3. The user may touch the displayed buttons by fingertip to operate the TV 1.

<Typical Behavior Observed at Power-On>

Figure 4:
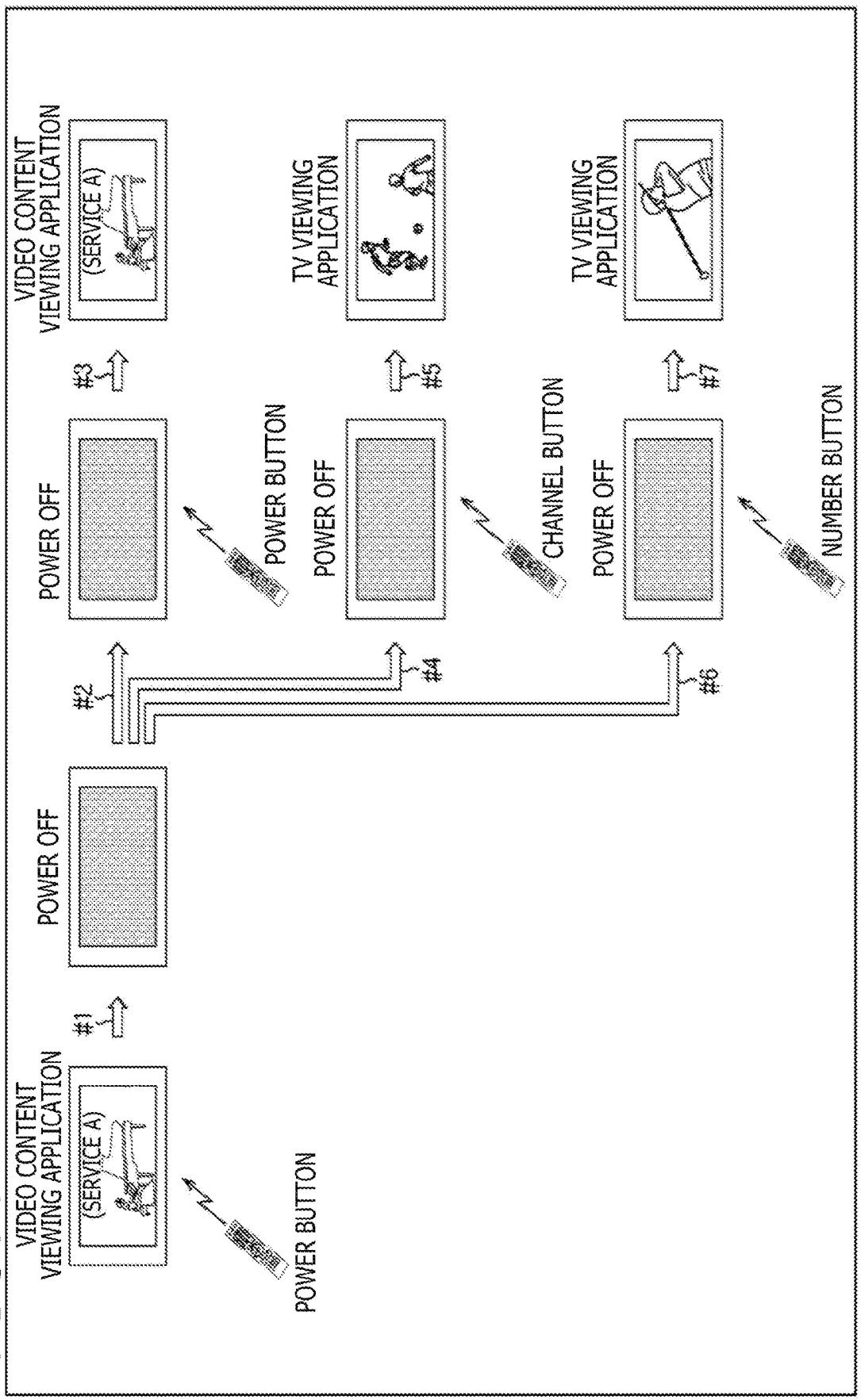

FIG. 4 is a schematic diagram depicting a typical behavior observed when the power supply is turned on.

Depicted in the top left of FIG. 4 is a state in which the user has started the video content viewing application 12-3 and is viewing given video content. The display of the TV 1 displays the image of the video content selected by the user.

In the case where the user presses the power button 21 in the above state, the power supply of the TV 1 is turned off. As pointed to by an arrow #1, the display of the TV 1 is in a blank display state. The application that was active immediately before power-off is the video content viewing application 12-3.

Incidentally, the state in which an application is active is a state where the user can verify from the screen display that the application is being active and where the function of the application is usable. In the TV 1, multiple applications are simultaneously active. Of the active applications, the one that executes processing for screen display and can be used by the user who operates the remote controller 4 to perform a predetermined process is the active application.

Moreover, the power-off state, also known as a standby state or a sleep state, is a state in which an operation of the remote controller 4 is awaited. During the power-off state, the main power remains on and the TV 1 is kept powered from an outlet, for example.

The power-on state, by contrast, is a state in which the standby state or the sleep state is released and a predetermined application is started so that a given screen is displayed on the display. In the power-on state, the user can obviously operate the remote controller 4 to make use of the functions of the active applications.

When, with the TV 1 in the power-off state, the user presses the power button 21 as pointed to by an arrow #2, the power supply of the TV 1 is turned on as pointed to by an arrow #3. The display then displays the screen of the video content viewing application 12-3 as the application that was active immediately before power-off. At power-on, the video content viewing application 12-3 is thus simultaneously started and executed.

The screen displayed immediately after power-on may be any one of the following as long as the screen is displayed by the video content viewing application 12-3: the screen of the video content viewed by the user immediately before power-off, and the menu screen of the service A.

In this manner, pressing the power button 21 starts the application that was used immediately before power-off and allows the user to make use of the function of the application immediately after power-on. Viewing the rest of the video content that was viewed immediately before power-off would require carrying out operations such as selecting the video content viewing application 12-3 from the menu screen, for example. However, such a fuss is not necessary if the menu screen is arranged to be displayed immediately after power-on.

Similar processing is also performed in the case where a non-TV application other than the video content viewing application 12-3 was active immediately before power-off. Where the power button 21 is pressed in the power-off state, the screen of the non-TV application that was active immediately before power-off is displayed.

On the other hand, where the user presses the channel button 29 in the power-off state as pointed to by an arrow #4, the power supply of the TV 1 is turned on as pointed to by an arrow #5. The display then displays the program currently distributed on the channel that was last selected.

More specifically, turning on the power supply of the TV 1 starts and executes the TV viewing application 12-1. Moreover, on the basis of previously saved information, the last selected channel is identified and reception of the last channel is started (i.e., the program distributed on the last channel starts to be received).

In the TV 1, the information regarding the last channel is saved into memory when the TV viewing application 12-1 is terminated by switching to another application or by power-off. Pressing the channel button 29 in the power-off state serves as the operation to select the last channel.

Moreover, in the case where the user presses one of the number buttons 22 in the power-off state as pointed to by an arrow #6, the power supply of the TV 1 is turned on as pointed to by an arrow #7. The display then displays the program currently distributed on the channel selected by use of the number button 22. For example, if the number button marked "1" is pressed, reception is started on the channel that is assigned channel number 1 corresponding to the button pressed, and the image of the program currently distributed on the channel is displayed.

In the case where no channel is set corresponding to the button pressed by the user, reception may be started on the last channel as in the case where the channel button 29 is pressed so that the image of the program currently distributed on the last channel may be displayed.

Pressing one of the channel selection button starts the TV viewing application 12-1 and allows the user to view the program currently distributed on the selected channel from where it was left off immediately after power-off. Viewing the program distributed on a given channel would require carrying out operations such as selecting the TV viewing application 12-1 from the menu screen, for example. However, such a fuss is not necessary if the menu screen is arranged to be displayed immediately after power-on.

In this manner, pressing the power button 21 in the power-off state starts the application that was active immediately before power-off.

Also, pressing one of the channel selection buttons in the power-off state starts the TV viewing application 12-1 in a preferential manner regardless of the application used by the user immediately before power-off.

The number buttons 22 and the channel button 29 are mainly used for channel selection. Pressing any of these buttons in the power-off state is thus interpreted as indicative of the user's desire to view the program currently distributed on the selected channel immediately after power-on. Processing is therefore carried out as desired by the user to start program reception on the selected channel upon pressing of any one of the channel selection buttons.

A series of processes on the TV 1 will be discussed later with reference to the accompanying flowcharts, the processes being designed to change the application to be started in accordance with the button pressed by the user as described above.

<Configuration of the TV 1>

Figure 5:
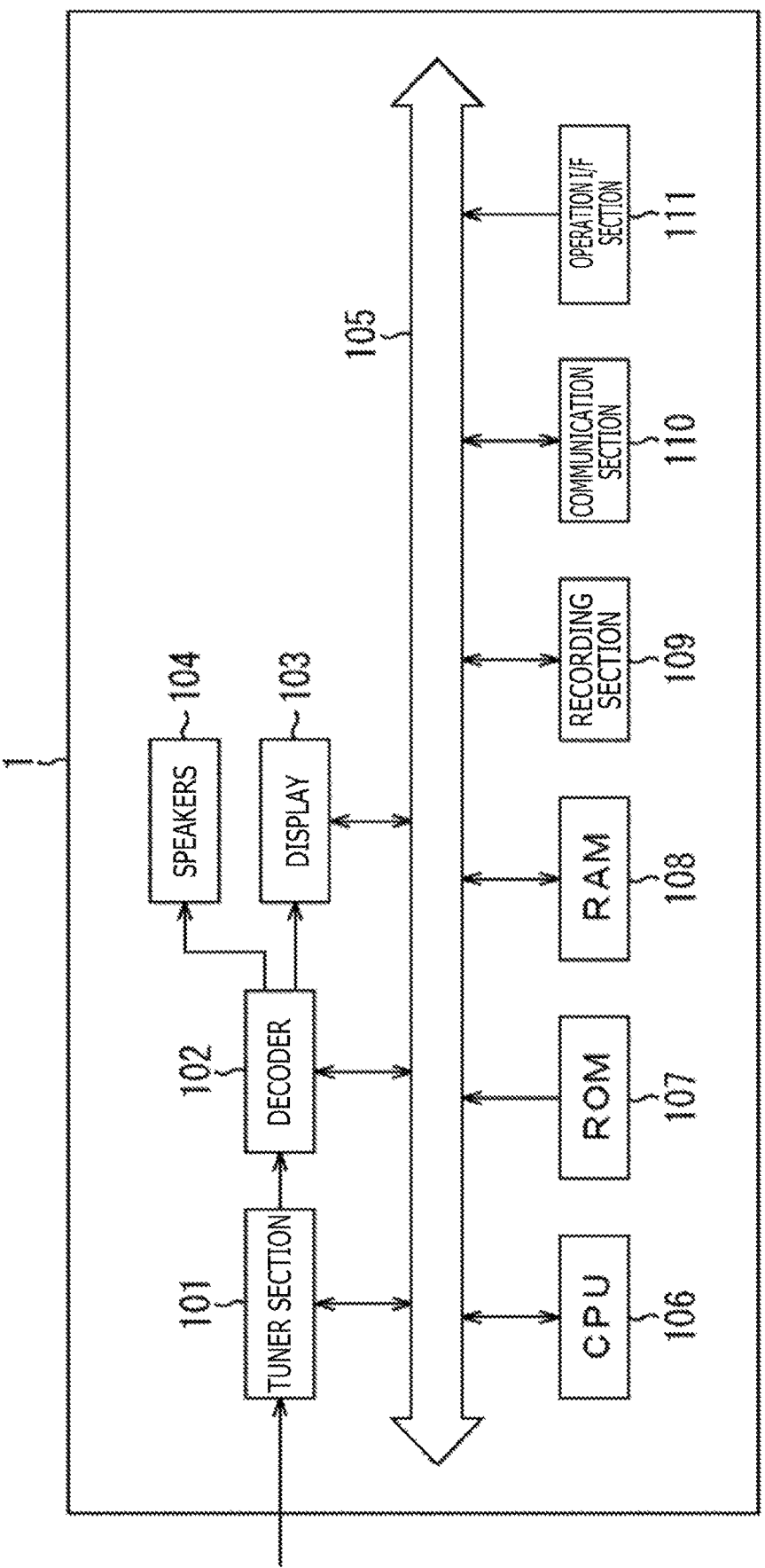
FIG. 5 is a block diagram depicting a typical TV hardware configuration.

FIG. 5 is a block diagram depicting a typical TV 1 hardware configuration.

A tuner section 101 receives a broadcast wave signal supplied from an antenna, not depicted, from a satellite broadcast, or from a set-top box of a cable TV. From the received signal, the tuner section 101 extracts the signal of the channel selected by the user. The tuner section 101 performs various processes such as A/D conversion and demodulation on the extracted signal to acquire program data, and outputs the acquired program data to a decoder 102.

The decoder 102 decodes a video stream constituting the program data to display the image of a program on a display 103 such as an LCD (Liquid Crystal Display) or an organic EL display. Also, the decoder 102 outputs program sounds from speakers 104 by synchronizing an audio stream constituting the program data with the program image.

A CPU (Central Processing Unit) 106, a ROM (Read Only Memory) 107, and a RAM (Random Access Memory) 108 are connected with one another via a bus 105. The CPU 106 controls the TV 1 as a whole by executing programs recorded in the ROM 107 or in a recording section 109 through the use of the RAM 108.

The recording section 109 includes a recording medium such as an HDD (Hard Disk Drive) or an SSD (Solid State Drive). The recording section 109 records various data including program data, EPG data, and programs.

A communication section 110 acts as an interface with the network 3. The communication section 110 communicates with the distribution server 2.

An operation I/F section 111 receives commands transmitted from the remote controller 4, and forwards the commands to the CPU 106 via the bus 105.

Figure 6:
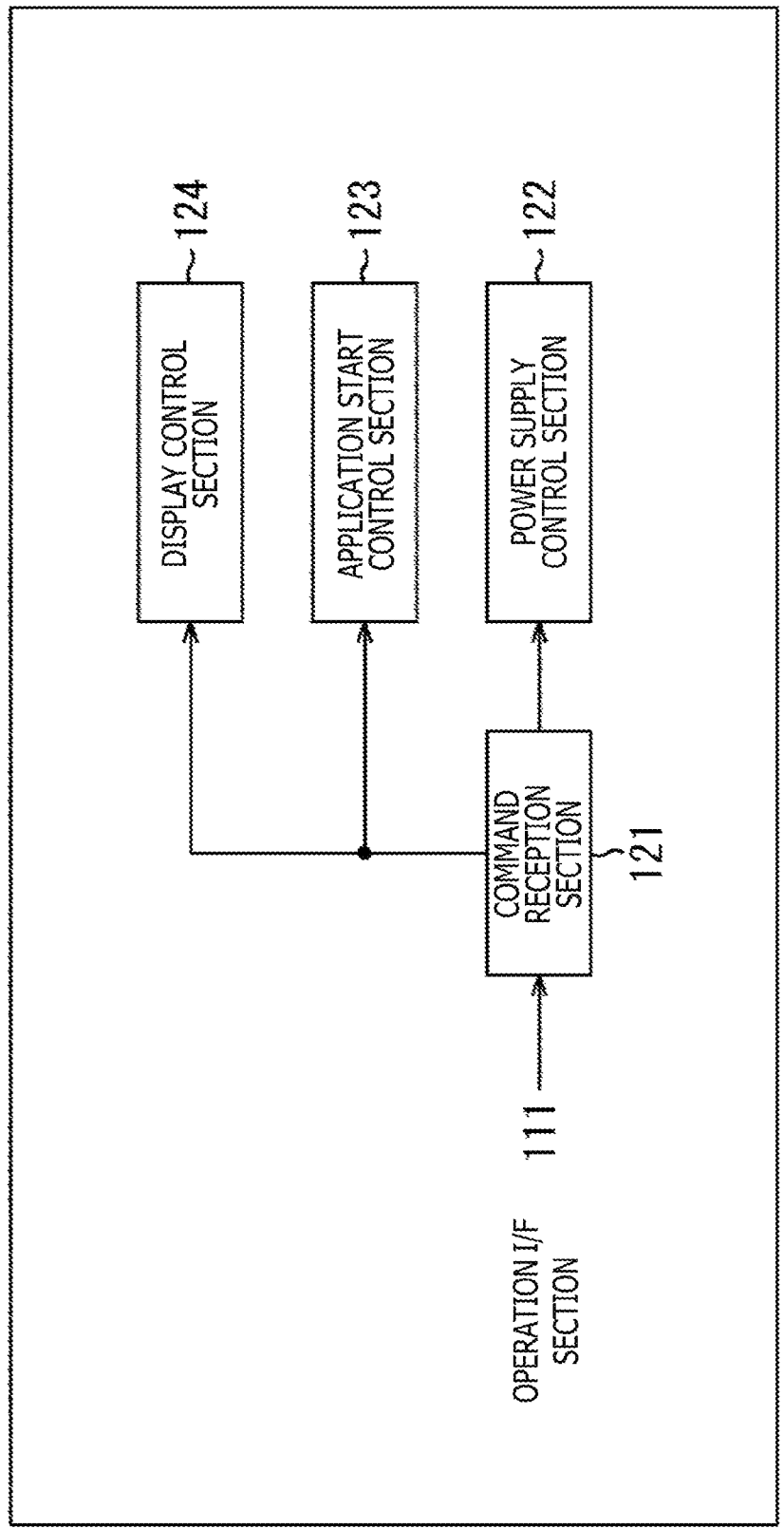
FIG. 6 is a block diagram depicting an example of a TV function configuration.

FIG. 6 is a block diagram depicting a typical TV 1 function configuration.

At least some of the functional sections depicted in FIG. 6 are implemented by the CPU 106 in FIG. 5 that executes relevant programs including the TV OS 11. A command reception section 121, a power supply control section 122, an application start control section 123, and a display control section 124 are implemented by the TV 1.

The command reception section 121 receives commands transmitted by the remote controller 4 and received by the operation I/F section 111. The command reception section 121 outputs the command corresponding to the button pressed by the user to the power supply control section 122, to the application start control section 123, and to the display control section 124. The command reception section 121 converts the received command as needed in such a manner that the command will be understood by the functional section as the output destination.

The power supply control section 122 drives a power supply circuit, not depicted, to provide on/off control of the power supply of the TV 1. For example, in the case where the power button 21 is pressed in the power-on state, the power supply control section 122 turns off the power supply of the TV 1. Where any one of the predetermined button such as the power button 21, number buttons 22, and channel button 29 is pressed with the power supply of the TV remains off the power supply control section 122 turns on the power supply of the TV 1.

The application start control section 123 controls execution of the applications. For example, in the case where the TV button 26 is pressed or where viewing of a given program is selected from the home screen, the application start control section 123 starts and executes the TV viewing application 12-1. Also, where the net video button 23 is pressed or where viewing of video content from the service A is selected from the home screen, the application start control section 123 starts and executes the video content viewing application 12-3.

The display control section 124 controls display on the display 103 such as the screen of various applications.

<Operation of the TV 1>

A control process of the TV 1 configured as described above is explained below with reference to the flowchart of FIG. 7.

Figure 7:
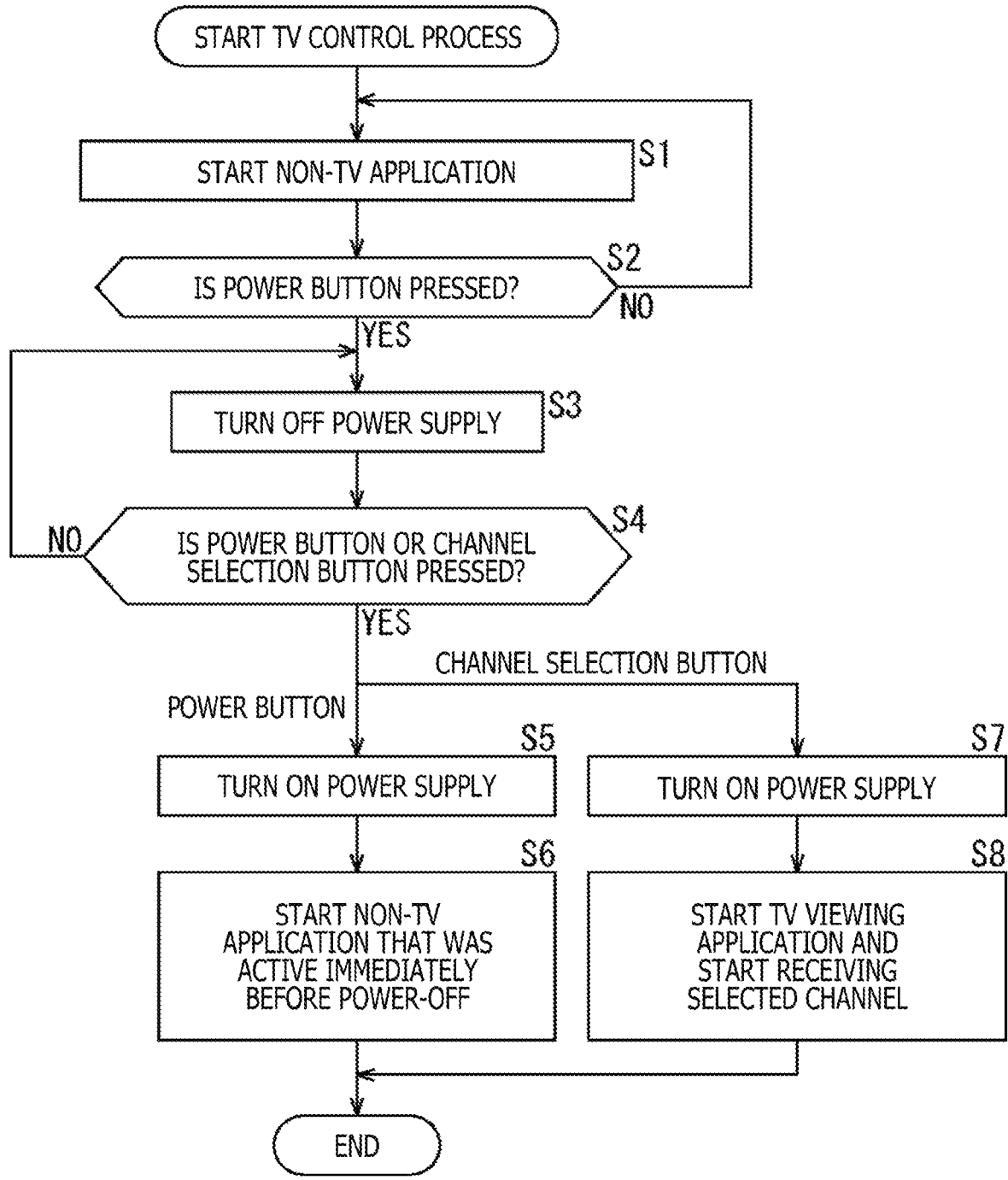

The process in FIG. 7 is carried out when, with TV 1 in the power-on state, the start of a non-TV application is ordered by pressing of a given button on the remote controller 4 or by selection of a function other than that of program viewing from the home screen. The command reception section 121 supplies the relevant sections with the command corresponding to the user's operations.

In step S1, the application start control section 123 starts and executes the non-TV application corresponding to the user's operations.

For example, in the case where viewing of the video content of the service A is selected, the application start control section 123 starts the video content viewing application 12-3. The application start control section 123 causes the display 103 to display a menu screen. Reproduction of the video content selected by the user from the menu screen is then started. The video content is transmitted by the distribution server 2, received by the communication section 110, and acquired and reproduced by the video content viewing application 12-3. The image of the reproduced video content is displayed on the display 103 and the sound of the content is output from the speakers 104.

In step S2, the power supply control section 122 determines whether or not the power button 21 is pressed on the basis of the command supplied from the command reception section 121. Until the power button 21 is determined to be pressed in step 52, control is returned to step S1 and the non-TV application is continuously processed.

In the case where the power button 21 is determined to be pressed in step S2, step S3 is reached. In step S3, the power supply control section 122 turns off the power supply of the TV 1. The display on the display 103 is turned off.

In step S4, the power supply control section 122 determines whether the power button 21 or any one of the channel selection buttons is pressed. The description that follows will explain the processing carried out when the power button 21 or any one of the channel selection buttons (number buttons 22 and channel button 29) is pressed. Until the power button 21 or any one of the channel selection buttons is determined to be pressed in step S4, control is returned to step S3 and the power-off state is continued.

In the case where the power button 21 is determined to be pressed in step S4, step S5 is reached. In step S5, the power supply control section 122 turns on the power supply of the TV 1.

In step S6, the application start control section 123 starts and executes the same non-TV application that was active and used by the user immediately before power-off. Immediately after power-on, the display 103 displays the screen of the non-TV application.

As described above, where the user was viewing the video content of the service A immediately before power-off, the application start control section 123 starts the video content viewing application 12-3. The display 103 displays screens of the video content viewing application 12-3 such as the menu screen and the image of video content.

On the other hand, in the case where one of the channel selection buttons is determined to be pressed in step S4, step S7 is reached. In step S7, the power supply control section 122 turns on the power supply of the TV 1.

In step S8, the application start control section 123 starts and executes the TV viewing application 12-1. When thus started, the TV viewing application 12-1 controls the tuner section 101 to start receiving the signal of the channel selected by the user and to acquire the data of the program currently distributed on the user-selected channel.

In the case where one of the number buttons 22 is pressed as the channel selection button, the data of the program currently distributed on the channel whose number corresponds to the pressed button is acquired. Moreover, where the channel button 29 is pressed as the channel selection button, the data of the program currently distributed on the last channel is acquired. The acquired program data is decoded by the decoder 102 and the image of the program is displayed on the display 103.

After the non-TV application is started in step S6, or after the TV viewing application 12-1 is started in step S8, the control process in the power-on state is terminated. Thereafter, the ongoing applications are processed.

The above process enables the TV 1 to start the application for implementing the function desired by the user immediately after power-on.

Explained next with reference to the flowchart of FIG. 8 is the process carried out where the TV viewing application 12-1 was active immediately before power-off.

The process in FIG. 8 is performed when, with the TV 1 kept on, program viewing is ordered by the user. The command reception section 121 supplies the relevant sections with the commands corresponding to the user's operations.

In step S11, the application start control section 123 starts and executes the TV viewing application 12-1.

During execution of the TV viewing application 12-1, reproduction of the program currently distributed on the channel selected using the number buttons 22 or the channel button 29 is started. The display 103 displays the image of the currently distributed program.

In step S12, the power supply control section 122 determines whether or not the power button 21 is pressed on the basis of the command supplied from the command reception section 121. Until the power button 21 is determined to be pressed in step S12, control is returned to step S11 and reproduction of the currently distributed program is continued.

In the case where the power button 21 is determined to be pressed in step S12, step S13 is reached. In step S13, the power supply control section 122 turns off the power supply of the TV 1. The display on the display 103 is turned off.

In step S14, the power supply control section 122 determines whether the power button 21 or any one of the channel selection buttons is pressed. Until the power button 21 or any one of the channel selection buttons is determined to be pressed in step S14, control is returned to step S13 and the power-off state is continued.

In the case where the power button 21 is determined to be pressed in step S14, step S15 is reached. In step S15, the power supply control section 122 turns on the power supply of the TV 1.

In step S16, the application start control section 123 starts and executes the TV viewing application 12-1. When thus started, the TV viewing application 12-1 controls the tuner section 101 to start receiving the signal of the last channel and to acquire the data of the program currently distributed on the last channel. Immediately after power-on, the display 103 displays the image of the program currently distributed on the last channel.

On the other hand, in the case where one of the channel selection buttons is determined to be pressed in step S14, step S17 is reached. In step S17, the power supply control section 122 turns on the power supply of the TV 1.

In step S18, the application start control section 123 starts and executes the TV viewing application 12-1. When thus started, the TV viewing application 12-1 controls the tuner section 101 to start receiving the signal of the channel selected by the user and to acquire the data of the program currently distributed on the user-selected channel.

In the case where one of the number buttons 22 is pressed as the channel selection button, the data of the program currently distributed on the channel whose number corresponds to the pressed button is acquired. Moreover, where the channel button 29 is pressed as the channel selection button, the data of the program currently distributed on the last channel is acquired. The acquired program data is decoded by the decoder 102 and the image of the program is displayed on the display 103.

After the TV viewing application 12-1 is started in step S16 or in step S18, the control process in the Power-on state is terminated. Thereafter, each ongoing application is processed.

In this manner, where the power supply is turned off during program viewing and where the power button 21 is pressed in the power-off state, the TV viewing application 12-1 that was active immediately before power-off is started. Reception of the channel that was received immediately before power-off is then started.

Also, pressing one of the channel selection buttons in the power-off state starts the TV viewing application 12-1. Reception of the channel selected by the user is then started.

Explained above was the processing in two cases: one in which the power button 21 is pressed in the power-off state, and another in which one of the channel selection buttons is pressed in the power-off state. Similar processing is also carried out in the case where some other button is pressed.

For example, where the TV button 26 is pressed in the power-off state, the TV viewing application 12-1 is started and reception of the last channel is started as well, as in the case where the channel button 29 is pressed. Moreover, where the program guide button 27 is pressed in the power-off state, the program guide application 12-5 is started and a program guide is displayed on the display 103 immediately after power-on, as in the case of the processing where another non-TV application is started.

Second Embodiment

There may be a case in which the power supply was turned off during use of a non-TV application and one of the channel selection buttons is pressed thereafter. In this case, the user may be allowed to select whether to start viewing a program or to start the non-TV application that was active immediately before power-off so as to perform the processing corresponding to the pressed channel selection button. In this case, unlike in the above-described example, the TV viewing application 12-1 may not always be given priority.

There may also be a case where the non-TV applications such as the video content viewing applications 12-3 and 12-4 are operable using the number buttons 22 or the channel button 29 and where each of these buttons is assigned a predetermined function. The user can selectively turn on the power supply to start a non-TV application so as to perform the process of implementing the function corresponding to the pressed channel selection button.

FIG. 9 is a schematic diagram depicting another typical behavior observed when the power supply is turned on.

Depicted in the top left of FIG. 9, as explained above with reference to FIG. 4, is the state in which the user has started the video content viewing application 12-3 and is viewing given video content. The display 103 of the TV 1 displays the image of the video content selected by the user.

In the case where the user presses the power button 21 in the above state, the power supply of the TV 1 is turned off. As pointed to by an arrow #11, the display 103 of the TV 1 is turned off.

When, with the TV 1 in the power-off state, the user presses the power button 21 as pointed to by an arrow #12, the power supply of the TV 1 is turned on as pointed to by an arrow #13. The display 103 then displays the screen of the video content viewing application 12-3 as the non-TV application that was active immediately before power-off. At power-on, the video content viewing application 12-3 is thus started and executed.

As described above, the process performed in a case where the power button 21 is pressed is similar to the process explained above with reference to FIG. 4.

On the other hand, there may be a case in which, with the TV 1 in the power-off state, the user presses one of the channel selection buttons as pointed to by an arrow #14. In this case, the power supply of the TV 1 is turned on as pointed to by an arrow #15, and the display 103 displays a selection screen for selecting whether or not to start program viewing. Using the cross button 24 and the enter button 25, the user selects whether or not to start program viewing by starting the TV viewing application 12-1. The selection screen is used for selecting the application to be started.

In the case where the start of program viewing is selected on the selection screen, the power supply of the TV 1 is turned on as pointed to by an arrow #16. The image of the program currently distributed on the channel selected by the user is then displayed.

More specifically, the TV viewing application 12-1 is started at power-on. Where the channel button 29 was previously pressed, reception of the last channel is started and the image currently distributed on the last channel is displayed. Moreover, where one of the number buttons 22 was previously pressed, reception of the user-selected channel is started and the image currently distributed on that channel is displayed.

In the case where the non-start of program viewing is selected on the selection screen, the power supply of the TV 1 is turned on. The same non-TV application that was active immediately before power-off is then started. The non-TV application performs processing to implement the function assigned to the pressed channel selection button. The display 103 then displays a screen relevant to the function as needed.

As described above, the user may be prompted to select whether to give priority to the TV viewing application 12-1 so as to start program viewing, or to give priority to the non-TV application that was active immediately before power-off so as to use its function. This also enables the TV 1 to perform processing as desired by the user. Alternatively, whether to give priority to the TV viewing application or to the non-TV application may be determined on the basis of whether the button is long-pressed or short-pressed. For example, when the button is short-pressed, the TV viewing application may be given priority; when the button is long-pressed, the non-TV application may be given priority. As another alternative, which application to give priority to may be determined by how many times the button is pressed.

The process of the TV 1 for controlling the start of applications as outlined above is explained below with reference to the flowchart of FIG. 10. The process in FIG. 10 is started when, with the TV 1 in the power-on state, the start of a non-TV application is ordered.

Of the steps in FIG. 10, those that are the same as the steps in FIG. 7 will not be described further where appropriate. Steps S21 through S26 in FIG. 10 are similar to step S1 through S6 in FIG. 7, respectively.

In step S21, the application start control section 123 starts and executes the non-TV application corresponding to the user's operations.

In step S22, the power supply control section 122 determines whether or not the power button 21 is pressed. Until the power button 21 is determined to be pressed in step S22, control is returned to step S21 and the non-TV application is continuously processed.

In the case where the power button 21 is determined to be pressed in step S22, step S23 is reached. In step S23, the power supply control section 122 turns off the power supply of the TV 1. The display 103 is turned off.

In step S24, the power supply control section 122 determines whether the power button 21 or one of the channel selection buttons is pressed. Until the power button 21 or one of the channel selection buttons is determined to be pressed in step S24, control is returned to step S23 and the power-off state is continued.

In the case where the power button 21 is determined to be pressed in step S24, step S25 is reached. In step S25, the power supply control section 122 turns on the power supply of the TV 1.

In step S26, the application start control section 123 starts and executes the same non-TV application that was active and used by the user immediately before power-off. Immediately after power-on, the display 103 displays the screen of the non-TV application.

On the other hand, in the case where one of the channel selection buttons is determined to be pressed in step S24, step S27 is reached. In step S27, the power supply control section 122 turns on the power supply of the TV 1.

In step S28, the display control section 124 causes the display 103 to display a selection screen for selecting the application to be executed.

In step S29, the application start control section 123 determines whether or not the TV viewing application 12-1 is selected as the application to be executed.

In the case where the TV viewing application 12-1 is determined to be selected in step S29 as a result of the determination to view the program, step S30 is reached. In step S30, the application start control section 123 starts and executes the TV viewing application 12-1. The TV viewing application 12-1 controls the tuner section 101 to start receiving the signal of the channel selected by the user and to acquire the data of the program currently distributed on the user-selected channel.

On the other hand, where it is determined in step S29 that the TV viewing application 12-1 is not selected as a result of the determination not to select program viewing, step S31 is reached. In step S31, the application start control section 123 starts and executes the non-TV application that was active immediately before power-off. The non-TV application performs the process of implementing the function assigned to the channel selection button pressed by the user.

After the non-TV application is started in step S26 or in step S31 or after the TV viewing application 12-1 is started in step S30, the control process at power-on is terminated. Thereafter, the ongoing applications are processed.

As described above, it is also possible to let the user select the application to be executed when one of the channel selection buttons is pressed.

Alternatively, in the case where, with the TV 1 in the power-on state, the user presses one of the channel selection buttons during display of the screen of the non-TV application, the selection screen for selecting whether or not to start program viewing may be arranged to appear. Where the start of program viewing is selected on the selection screen, the TV viewing application 12-1 is started and display of the image of the program is started as well. Moreover, where non-start of program viewing is selected on the selection screen, the non-TV application is continuously active. The non-TV application performs the process of implementing the function assigned to the pressed channel selection button, and the screen relevant to the function is displayed as needed.

Other Examples

Explained above was the changing of applications upon transition from the power-off state to the power-on state. The changing also applies to transitions from some other state such as one in which the home screen is displayed to a state different from that state.

For example, when the TV button 26 or the channel button 29 is pressed with the home screen displayed, the TV viewing application 12-1 may be started and reception of the last channel may be started as well. On the other hand, when one of the number buttons 22 is pressed, the non-TV application may be started to perform the process corresponding to the pressed button.

Moreover, whereas it was explained above that the apparatus used for program viewing is the TV, the technology is also applicable to a case where programs are viewed on a personal computer or to a case where programs are viewed on a mobile terminal such as a smartphone or a tablet terminal.

In the case where programs are viewed on a mobile terminal such as a personal computer or a mobile terminal, they may be received using the function of a virtual tuner. The virtual tuner is a software tuner that receives programs distributed via the Internet. The programs received by the function of the virtual tuner are the content of videos that are distributed according to a predetermined schedule on each of the channels established by service providers.

It was also explained above that the application to be started is changed in accordance with the type of the button pressed on the remote controller 4. Alternatively, the application to be started may be changed depending on the manner in which a given button is pressed.

For example, in the case where the power supply is turned off during activation of a non-TV application, a subsequent single-pressing operation of the power button may be arranged to start the non-TV application that was active immediately before power-off, or a subsequent long-pressing operation of the power button may be arranged to start the TV viewing application 12-1. The manner in which the button is pressed may be distinguished in terms of the pressing time such as whether the button is long-pressed or short-pressed or in terms of the number of times the button is pressed such as whether the button is single-clicked or double-clicked.

It was also explained above that the state where an application is active is the state where the ongoing application has its screen displayed. Alternatively, where the power supply is turned off while a non-TV application is being active but does not have its screen displayed (i.e., operating in the background), the same behavior as discussed above may be arranged to occur. For example, if the power supply is turned off when a non-TV application is being active but does not have its screen displayed, a subsequent pressing operation on one of the channel selection buttons may be arranged to turn on the power supply and start preferentially the TV viewing application that in turn may start reception of the selected channel.

<Typical Computer Configuration>

The series of steps and processes described above may be executed either by hardware or by software. Where a software-based series of processing is to be carried out, the programs constituting the software are installed into a suitable computer in dedicated hardware or into a general-purpose computer or like equipment from a program recording medium.

FIG. 11 is a block diagram depicting a typical hardware configuration of a computer that executes the above-described series of processing using programs.

A CPU (Central Processing Unit) 1001, a ROM (Read Only Memory) 1002, and a RAM (Random Access Memory) 1003 are interconnected via a bus 1004.

The bus 1004 is also connected with an input/output interface 1005. The input/output interface 1005 is connected with an input section 1006 including a keyboard and a mouse and with an output section 1007 including a display and speakers. The input/output interface 1005 is further connected with a storage section 1008 including a hard disk and a nonvolatile memory, with a communication section 1009 including a network interface, and with a drive 1010 that drives removable medium 1011.

In the computer configured as described above, the CPU 1001 performs the above-mentioned series of processing by loading programs from the storage section 1008 into the RAM 1003 via the input/output interface 1005 and the bus 1004 and by executing the loaded programs, for example.

The programs to bP executed by the CPU 1001 is offered by being recorded, for example, on the removable medium 1011 or via wired or wireless transmission media such as local area networks, the Internet and digital satellite broadcasts, and installed in the storage section 1008.

Also, the programs to be executed by the computer may each be processed chronologically, i.e., in the sequence depicted in this description, in parallel with other programs, or in otherwise appropriately timed fashion such as when the program is invoked as needed.

In this description, the term "system" refers to an aggregate of multiple components (e.g., apparatuses or modules (parts)). It does not matter whether all components are housed in the same enclosure. Consequently, a system may be configured with multiple apparatuses housed in separate enclosures and interconnected via a network, or with a single apparatus that houses multiple modules in a single enclosure.

The effects stated in this description are only examples and are not limitative of the present technology. There may be additional effects derived from this description.

The present technology is not limited to the embodiments discussed above and may be implemented in diverse variations so far as they are within the scope and spirit thereof.

<Typical Combination of Configurations>

The present technology may be implemented preferably in the following configurations.

(1)

A control method for use where a power supply of an apparatus having a first application and a second application is turned off during display of a screen of the second application and remains off, the first application being used to view a program distributed on each of channels in accordance with a predetermined schedule, the second application being different from the first application, the control method including the steps of:

in a case where a power button used to turn on or off the power supply is pressed, turning on the power supply of the apparatus to start simultaneously the second application and thereby display the screen thereof; and in a case where a channel selection button used to select a channel is pressed, turning on the power supply of the apparatus to start simultaneously the first application and thereby display an image of the program distributed on the selected channel.

(2)

The control method as stated in paragraph (1) above, in which the power supply of the apparatus is turned off during display of the image of the program distributed on a given channel and remains off, the control method further including the steps of:

in a case where the power button is pressed, turning on the power supply of the apparatus to start simultaneously the first application and thereby display the image of the program on the channel that was selected immediately before the power supply of the apparatus was turned off; and in a case where the channel selection button is pressed, turning on the power supply of the apparatus to start simultaneously the first application and thereby display the image of the program distributed on the selected channel.

(3)

The control method as stated in paragraph (1) or (2) above, in which the first application processes the program distributed by use of a broadcast signal; and the second application processes video content distributed over a network in accordance with a selection made by a user.

(4)

The control method as stated in any one of paragraphs (1) to (3) above, further including:

the step of determining whether the power button or the channel selection button is pressed in accordance with a command transmitted from an operating device equipped with the power button and the channel selection button.

(5)

A program for use with a computer where a power supply of an apparatus having a first application and a second application is turned off during display of a screen of the second application and remains off, the first application being used to view a program distributed on each of channels in accordance with a predetermined schedule, the second application being different from the first application, the program causing the computer to execute a process including steps:

in a case where a power button used to turn on or off the power supply is pressed, turning on the power supply of the apparatus to start simultaneously the second application and thereby display the screen thereof; and in a case where a channel selection button used to select a channel is pressed, turning on the power supply of the apparatus to start simultaneously the first application and thereby display an image of the program distributed on the selected channel.

(6)

A control apparatus for use where the power supply of an apparatus having a first application and a second application is ordered to be turned off during display of a screen of the second application and remains off, the first application being used to view a program distributed on each of channels in accordance with a predetermined schedule, the second application being different from the first application, the control apparatus including:

a power supply control section configured to turn on the power supply either in a case where a power button used to turn on or off the power supply is pressed or in a case where a channel selection button used to select a channel is pressed; and a start control section configured to start the second application and thereby display the screen thereof when the power supply is turned on by pressing the power button, the start control section being further configured to start the first application and thereby display an image of the program distributed on the selected channel when the power supply is turned on by pressing the channel selection button.

(7)

A control method for use where a power supply of an apparatus having a first application and a second application is turned off during display of a screen of the second application and remains off, the first application being used to view a program distributed on each of channels in accordance with a predetermined schedule, the second application being different from the first application, the control method including the step of:

turning on the power supply of the apparatus to start simultaneously the second application and thereby execute a predetermined process in a case where a channel selection button is pressed, the channel selection button being used to select a channel during display of an image of the program distributed on a given channel, the channel selection button being further used to select the predetermined process assigned to the channel selection button during display of the screen of the second application.

(8)

The control method as stated in paragraph (7) above, further including the steps of:

in a case where the channel selection button is pressed while the power supply of the apparatus remains off, turning on the power supply of the apparatus to display simultaneously a screen for selecting whether to start the first application to display the image of the program distributed on the selected channel or to start the second application to execute the predetermined process; and in a case where a user selects execution of the predetermined process, start the second application to execute the predetermined process.

(9)

The control method as stated in paragraph (7) above, further including the steps of:

in a case where the channel selection button is pressed during display of the screen of the second application while the power supply of the apparatus remains on, displaying a screen for selecting whether to display the image of the program distributed on the selected channel or to execute the predetermined process using the second application; and in a case where a user selects execution of the predetermined process, executing the predetermined process using the second application.

(10)

A program for use with a computer where a power supply of an apparatus having a first application and a second application is turned off during display of a screen of the second application and remains off, the first application being used to view a program distributed on each of channels in accordance with a predetermined schedule, the second application being different from the first application, the program causing the computer to execute a process including steps:

turning on the power supply of the apparatus to start simultaneously the second application and thereby execute a predetermined process in a case where a channel selection button is pressed, the channel selection button being used to select a channel during display of an image of the program distributed on a given channel, the channel selection button being further used to select the predetermined process assigned to the channel selection button during activation of the screen of the second application.

(11) A control apparatus for use where the power supply of an apparatus having a first application and a second application is ordered to be turned off during display of a screen of the second application and remains off, the first application being used to view a program distributed on each of channels in accordance with a predetermined schedule, the second application being different from the first application, the control apparatus including:

a power supply control section configured to turn on the power supply of the apparatus in a case where a channel selection button is pressed, the channel selection button being used to select a channel during display of an image of the program distributed on a given channel, the channel selection button being further used to select the predetermined process assigned to the channel selection button during activation of the screen of the second application; and a start control section configured to start the second application and thereby execute the predetermined process when the power supply is turned on by pressing the channel selection button.

REFERENCE SIGNS LIST

1 Television receiver, 2 Distribution server, 4 Remote controller, 121 Command reception section, 122 Power supply control section, 123 Application start control section, 124 Display control section

The invention claimed is:

1. A control method for use where a power supply of an apparatus having a first application and a second application is turned off during display of a screen of the second application and remains off, the first application being used to view a program distributed on each of channels in accordance with a predetermined schedule, the second application being different from the first application, the control method comprising:

providing a controller having a power button and a channel selection button different from the power button;

in a case where the power button used to turn on or off the power supply is pressed, turning on the power supply of the apparatus to start simultaneously the second application and thereby display video content viewed by the user immediately before the power supply is turned off; and in a case where the channel selection button used to select a channel is pressed to turn on the apparatus, initiating the selection of starting the first application to display the program distributed on the selected channel or the second application to perform a process corresponding to the channel selection button.

2. The control method according to claim 1, wherein the power supply of the apparatus is turned off during display of the image of the program distributed on a given channel and remains the control method further comprising:

in a case where the power button is pressed, turning on the power supply of the apparatus to start simultaneously the first application and thereby display the image of the program on the channel that was selected immediately before the power supply of the apparatus was turned off; and in a case where the channel selection button is pressed, turning on the power supply of the apparatus to start simultaneously the first application and thereby display the image of the program distributed on the selected channel.

3. The control method according to claim 1, wherein the first application processes the program distributed by use of a broadcast signal, and the second application processes video content distributed over a network in accordance with a selection made by a user.

4. The control method according to claim 1, further comprising:

determining whether the power button or the channel selection button is pressed in accordance with a command transmitted from an operating device equipped with the power button and the channel selection button.

5. A control method for use where a power supply of an apparatus having a first application and a second application is turned off during display of a screen of the second application and remains off, the first application being used to view a program distributed on each of channels in accordance with a predetermined schedule, the second application being different from the first application, the control method comprising:

providing a controller having a power button and a channel selection button different from the power button that is used to turn the power supply on or off; and turning on the power supply of the apparatus to initiate the selection of starting the first application to display the program distributed on a selected channel or the second application to perform a process corresponding to the channel selection button in a case where the channel selection button is pressed to turn on the apparatus, the channel selection button being used to select a channel during display of an image of the program distributed on a given channel, the channel selection button being further used to select a predetermined process assigned to the channel selection button during display of the screen of the second application.

6. The control method according to claim 5, further comprising:

in a case where the channel selection button is pressed while the power supply of the apparatus remains off, turning on the power supply of the apparatus to display simultaneously a screen for selecting whether to start the first application to display the image of the program distributed on the selected channel or to start the second application to execute the predetermined process; and in a case where a user selects execution of the predetermined process, start the second application to execute the predetermined process.

7. A control apparatus for use where a power supply of an apparatus having a first application and a second application is ordered to be turned off during display of a screen of the second application and remains off, the first application being used to view a program distributed on each of channels in accordance with a predetermined schedule, the second application being different from the first application, the control apparatus comprising:

a processor configured to control turn on of the power supply of the apparatus in a case where a channel selection button is pressed without a power button being pressed, the channel selection button being used to select a channel during display of an image of the program distributed on a given channel, the channel selection button being further used to select the predetermined process assigned to the channel selection button during display of the screen of the second application; and start an initiation of selecting the first application to display the program distributed on a selected channel or the second application to perform a process corresponding to the channel selection button when the power supply is turned on by pressing the channel selection button, wherein the power button and the channel selection button are different buttons.

8. The control method according to claim 1, further comprising:

in a case where the channel selection button is pressed to turn on the apparatus, starting the first application to display the program distributed on the selected channel in a case where the first application is selected.

9. The control method according to claim 1, further comprising:

in a case where the channel selection button is pressed to turn on the apparatus, displaying a selection screen for selecting an application to be executed.

10. The control method according to claim 5, further comprising:

in a case where the channel selection button is pressed to turn on the apparatus, starting the first application to display the program distributed on the selected channel in a case where the first application is selected.

11. The control method according to claim 5, further comprising:

in a case where the channel selection button is pressed to turn on the apparatus, displaying a selection screen for selecting an application to be executed.

12. A non-transitory computer-readable medium having stored thereon a program for use with a computer where a power supply of an apparatus having a first application and a second application is turned off during display of a screen of the second application and remains off, the first application being used to view a program distributed on each of channels in accordance with a predetermined schedule, the second application being different from the first application, the program causing the computer to execute a process comprising:

in a case where a power button used to turn on or off the power supply is pressed, turning on the power supply of the apparatus to start simultaneously the second application and thereby display video content viewed by the user immediately before the power supply is turned off; and in a case where a channel selection button used to select a channel is pressed to turn on the apparatus, initiating the selection of starting the first application to display the program distributed on the selected channel or the second application to perform a process corresponding to the channel selection button, wherein the power button and the channel selection button are different buttons.

13. A control apparatus for use where a power supply of an apparatus having a first application and a second application is ordered to be turned off during display of a screen of the second application and remains off, the first application being used to view a program distributed on each of channels in accordance with a predetermined schedule, the second application being different from the first application, the control apparatus comprising:

a processor configured to control turn on of the power supply either in a case where a power button used to turn on or off the power supply is pressed or in a case where a channel selection button used to select a channel is pressed without the power button being pressed; and start of the second application and thereby display video content viewed by the user immediately before the power supply is turned off when the power supply is turned on by pressing the power button, and to initiate the selection of starting the first application to display the program distributed on the selected channel or the second application to perform a process corresponding to the channel selection button when the power supply is turned on by pressing the channel selection button, wherein the power button and the channel selection button are different buttons that is used to turn the power supply on or off.

14. The control method according to claim 5, further comprising:

in a case where the channel selection button is pressed during display of the screen of the second application while the power supply of the apparatus remains on, displaying a screen for selecting whether to display the image of the program distributed on the selected channel or to execute the predetermined process using the second application; and in a case where a user selects execution of the predetermined process, executing the predetermined process using the second application.

15. A non-transitory computer-readable medium having stored thereon a program for use with a computer where a power supply of an apparatus having a first application and a second application is turned off during display of a screen of the second application and remains off, the first application being used to view a program distributed on each of channels in accordance with a predetermined schedule, the second application being different from the first application, the program causing the computer to execute a process comprising:

providing a controller having a power button and a channel selection button different from the power button; and turning on the power supply of the apparatus without the power button being pressed, to initiate selection of starting the first application to display the program distributed on a selected channel or the second application to perform a process corresponding to the channel selection button in a case where the channel selection button is pressed to turn on the apparatus, the channel selection button being used to select a channel during display of an image of the program distributed on a given channel, the channel selection button being further used to select a predetermined process assigned to the channel selection button during display of the screen of the second application.

16. The control apparatus according to claim 13, wherein the processor is further configured to control, in a case where the channel selection button is pressed to turn on the apparatus, start of the first application to display the program distributed on the selected channel in a case where the first application is selected.

17. The control apparatus according to claim 13, wherein the processor is further configured to control, in a case where the channel selection button is pressed to turn on the apparatus, display of a selection screen for selecting an application to be executed.

* * * * *